Patented Apr. 20, 1948

2,440,119

UNITED STATES PATENT OFFICE 2,440,119

METHINE DYESTUFFS

Oskar Riester, Dessau, and Gustav Wilmanns, Wolfen, Kreis Bitterfeld, Germany, assignors, by mesne assignments, to General Aniline & Film Corporation, New York, N. Y., a corporation of Delaware No Drawing. Application November 13, 1939, Serial No. 304,173. In Germany November 9, 1938

7 Claims. (Cl. 260—240)

This invention relates to the production of methine dyestuffs.

According to the U. S. patent application Ser. No. 237,474, filed October 28, 1938, dyestuffs of the following constitution

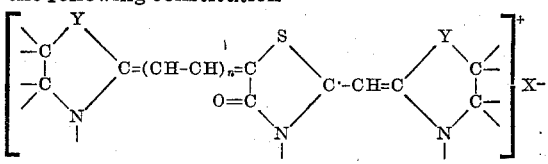

are obtained by reacting dyes which contain the rhodanine nucleus with alkylhalides, dialkylsulfates, etc., and further condensing the reaction products with nitrogen containing heterocyclic compounds which possess a reactive methyl- or methylene-group.

It is an object of the present invention to provide a process for the production of similarly constituted dyestuffs having improved properties.

A further object of the invention is the provision of new methine dyestuffs suitable as photographic sensitizers.

Still further objects of the invention will become apparent from the detailed description following hereinafter.

We have found, that unexpectedly dyestuffs of similar constitution as the above mentioned dyestuffs can be obtained by employing as starting materials dyes containing the thiohydantoine nucleus instead of the rhodanine nucleus proposed previously. The dyes are obtained according to the following formula:

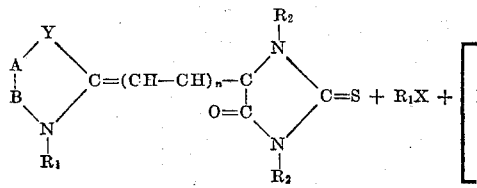

A and B stand for the atom groupings necessary for completing the ring, such as for instance

phenylene, naphthylene, etc.
Y stands for O, S, Se,

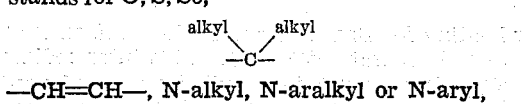

—CH=CH—, N-alkyl, N-aralkyl or N-aryl, $R_1$ stands for alkyl or aralkyl,
$R_2$ stands for alkyl, aralkyl, aryl,
X is an acid radical, for instance halogen, R—SO$_4$—, toluene-sulfalkyl, ClO$_4$, etc.
$n$ is a number 0, 1 or 2.

The intermediate product:

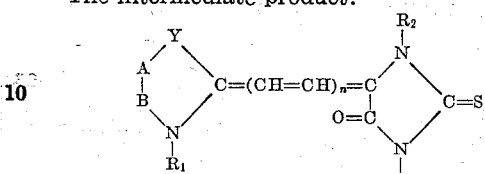

is obtained by condensing the thiohydantoine with aldehydes of the general formula:

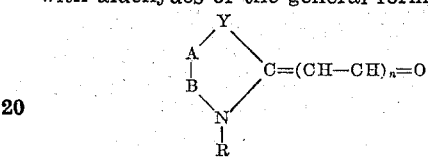

or with intermediate products of the general formula:

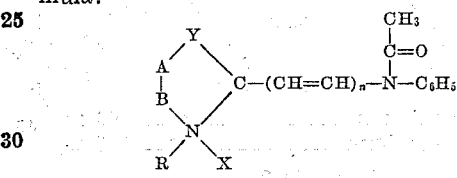

Dyestuffs of this constitution are of great intensity and are especially useful for the sensitiz-

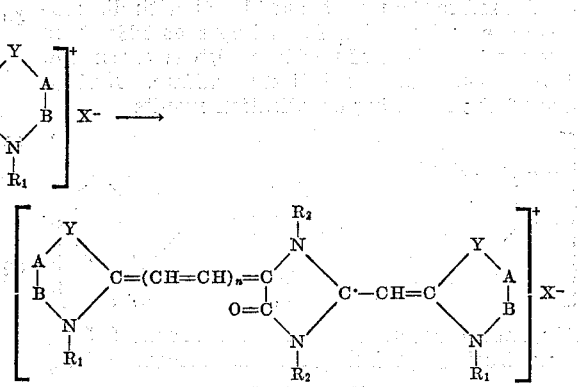

ing of silver halide emulsions especially for those emulsions commonly used in color photography which contain dyestuffs components fast to diffusion. The dyestuffs are not affected adversely in their sensitizing action by the color-forming development components in the emulsion.

*Example 1*

By condensing even parts of methyl-allyl-thiohydantoine and 5.6-dimethyl-1-ethyl-2-ω-phenylacetyl-amidopropene-benzthiazolium - toluene-sulfethylate of the following constitition

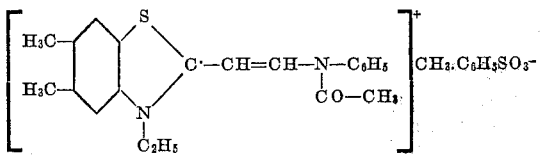

in 5-times their weight of pyridine for 4 hours at 110° C., the following intermediate product is obtained

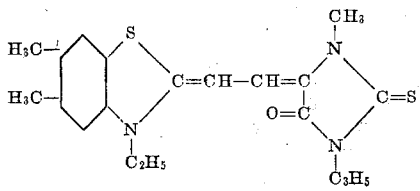

This product is heated with dimethylsulfate at 110° C. The resultant addition product

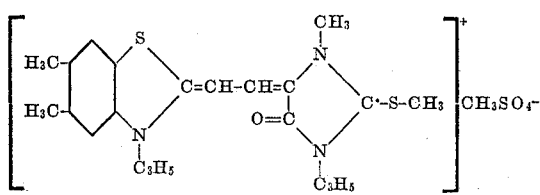

is converted into a dye by heating for two hours at 110° C., in pyridine with 5.6-dimethyl-2-methylbenzthiazolethyliodide. The dyestuff is precipitated by means of a solution of potassium-iodide. Its constitution is as follows:

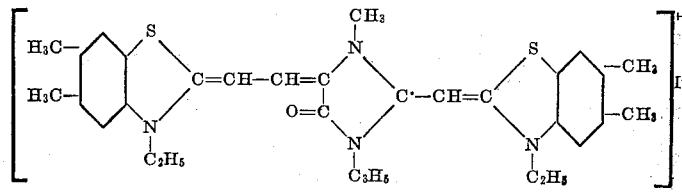

Absorption maximum_____ca___ 600 mμ
Sensitization maximum_____ca___ 630 mμ

*Example 2*

The intermediate product named under 1 is condensed for 10 minutes at 110° C. with dimethylsulfate and reacted for 3 hours at 105° C. in 5 times its weight of pyridine with even parts of 2-methyl-benzselenazol-diethyl-sulfate. A violet dye of the following constitution results

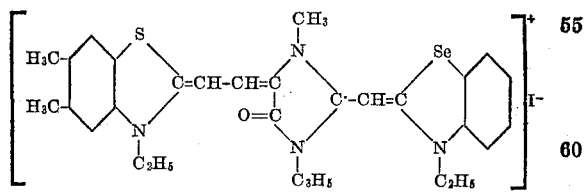

Absorption maximum_____ca___ 605 mμ
Sensitization maximum_____ca___ 633 mμ

*Example 3*

Even parts of dimethyl-thiohydantoine and 4-(ω - phenylacetyl - amidopropene) - 1 - methyllepidinium-methylsulfate of the following constitution:

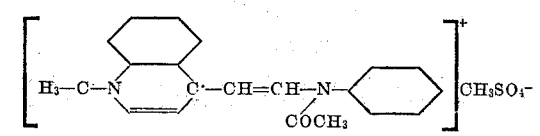

are reacted in 5 times their weight of pyridine to yield a blue intermediate product of the following constitution:

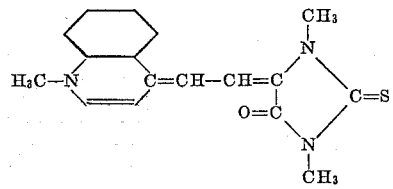

This latter is heated with the same amount of dimethyl sulfate for 5 minutes at 110° C. The resulting addition product is rubbed for a short while with absolute ether, the ether decanted and the addition product condensed for 2 hours at 110° C. with an equal amount of 2-methylbenzoxazol-diethylsulfate. The dye is precipitated as the iodide. It has the following constitution:

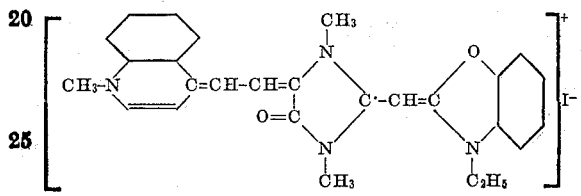

*Example 4*

Equal parts of N-ethyl-2-methylenethiazoline-ω-aldehyde (produced according to the method described in U. S. patent application Ser. No. 248,230, filed December 29, 1938) and methylphenylthiohydantoine are dissolved in 5 times their weight of pyridine and condensed by adding the same amount of piperidine and heating for 2 hours to 90° C. to yield an intermediate product of the following constitution:

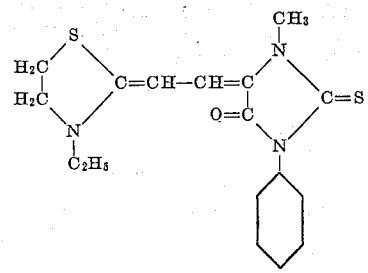

The yellow dye is converted into a compound of the following constitution:

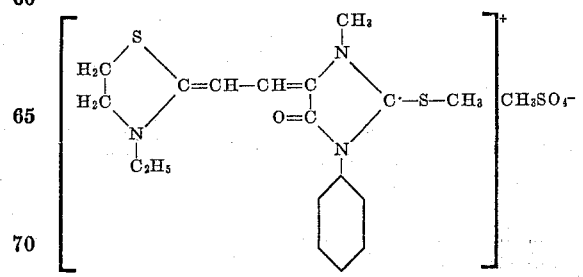

by heating for 10 minutes with the same amount of dimethylsulfate at 100° C. This intermediate product is dissolved in pyridine and condensed with the same amount of 2-methyl-4.5-naphthothiazoldiethylsulfate in pyridine to yield a red-violet dye of the following constitution:

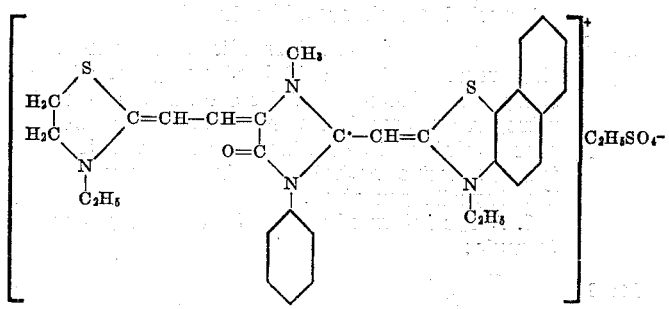

Example 5

5 grams of 1.3.3-trimethylindoline-2-methylene-ω-aldehyde are dissolved with 5 grams of methylallylthiohydantoine in 20 cc. pyridine and condensed by adding 20 cc. acetic acid anhydride and heating for half an hour at 90° C. to yield an orange-red intermediate product of the following constitution:

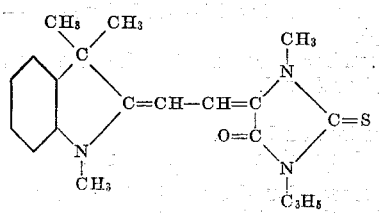

1 gram of this product is heated with 1 cc. dimethylsulfate for half an hour at 90° C. and dissolved after washing with absolute ether in 10 cc. of pyridine and then condensed to a violet dye of the following constitution:

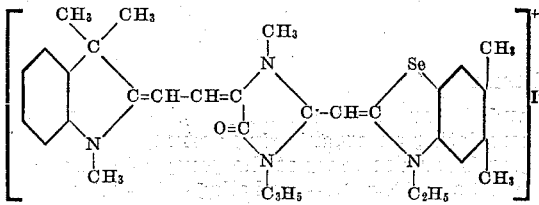

with 2 grams of 2.5.6-trimethylbenzselenazoldiethylsulfate for 2 hours at 110° C.

Example 6

231 mg. of the aldehyde

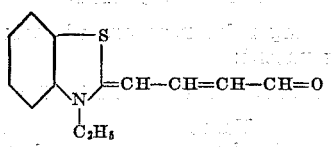

(obtainable according to the method described in U. S. Patent No. 2,152,615) by splitting the polymethine dye

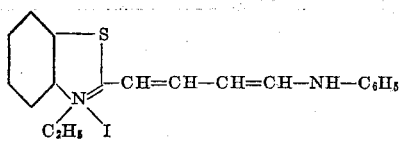

and 144 mg. of dimethylthiohydantoine (obtainable from aminoacetic acid and methyl mustard oil) are heated in 1 cc. pyridine and 0.5 cc. acetic acid anhydride. After cooling the dye of the following formula precipitates:

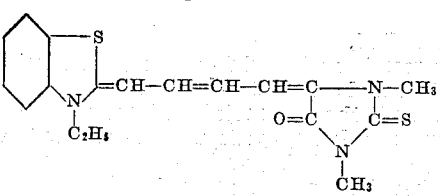

1 gram of this dye (produced in several small batches) is heated with 1 cc. of dimethylsulfate for an hour at 100° C. The oily product is rubbed with 10 cc. of ether. A viscous mass soluble in methanol with violet-red color results. Now, there is added 1 gram of 2-methylbenzthiazol-ethylsulfethylate and 3 cc. pyridine and the mixture is heated for an hour at 110° C. To the intensely violet liquid there are added a few cubic centimeters of methanol and 2 cc. of an aqueous potassium iodide solution of 10 per cent strength.

A dyestuff of the following formula precipitates:

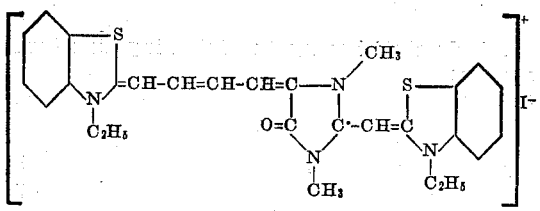

Absorption maximum in methanol_____ 690 mμ
Sensitizing maximum_____ 720 mμ

(The sensitizing maximum was determined by bathing an emulsion of medium sensitivity in a solution of the dye of 1 in 500,000.)

We claim:

1. A dyestuff having the following general formula

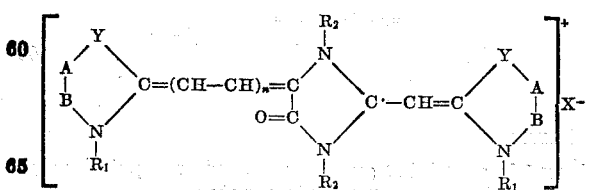

wherein

A and B stand for an atom grouping capable of completing an organic ring system, Y stands for the member of the group consisting of O, S, Se,

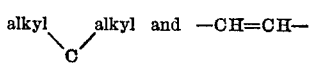

$R_1$ is alkyl, $R_2$ is a member selected from the class consisting of alkyl, aryl and X is an anion, and $n$ is a whole number smaller than 3.

2. A dyestuff having the following general formula:

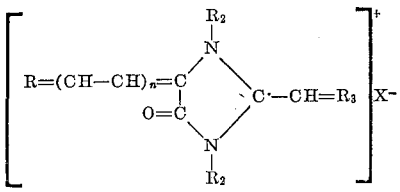

R and $R_3$ represent a radical selected from the class consisting of

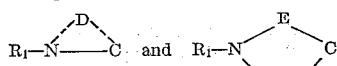

$R_1$ is an alkyl, $R_2$ is a member selected from the class consisting of alkyl and aryl, D represents the non-metallic atoms necessary to complete a heterocyclic nucleus selected from the group consisting of five-membered and six-membered heterocyclic nuclei, E represents a radical selected from the group consisting of vinylene and phenylene groups, X is an anion, and $n$ is a whole number less than 3.

3. A dyestuff having the following structural formula:

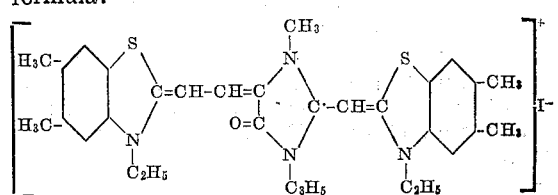

4. A dyestuff having the following structural formula:

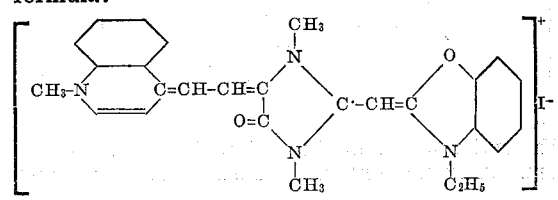

5. A process for the production of dyes comprising treating with an alkyl salt a compound of the following general formula:

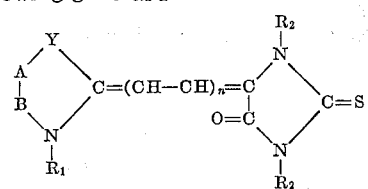

wherein

A and B stand for an atom grouping capable of completing an organic ring system, Y stands for a member of the group consisting of O, S, Se, —CH=CH— and alkyl —C— alkyl, $R_1$ is alkyl, $R_2$ is a member selected from the class consisting of alkyl and aryl, and $n$ is a whole number smaller than 3, and condensing the intermediate so formed, in the presence of an acid binding agent, with a compound selected from the class of heterocyclic nitrogen compounds which have a nucleus of the type contained in cyanine dyes and which contain a reactive methyl group in the α position to the ring nitrogen atom.

6. A dye intermediate of the following general formula:

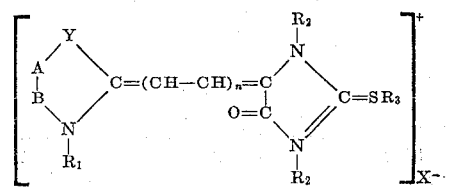

wherein

A and B stand for an atom grouping capable of completing an organic ring system, Y stands for the member of the group consisting of O, S, Se, —CH=CH— and alkyl —C— alkyl, $R_1$ is alkyl, $R_2$ is a member selected from the class consisting of alkyl and aryl, $R_3$ is alkyl, X is an anion, and $n$ is a whole number smaller than 3.

7. A process for the production of dyes comprising treating with an alkyl salt a compound of the following general formula:

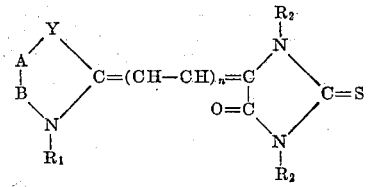

wherein

A and B stand for an atom grouping capable of completing an organic ring system, Y stands for a member of the group consisting of O, S, Se, —CH=CH— and alkyl —C— alkyl, $R_1$ is alkyl, $R_2$ is a member selected from the class consisting of alkyl and aryl, and $n$ is a whole number smaller than 3.

OSKAR RIESTER.
GUSTAV WILMANNS.

REFERENCES CITED

The following references are of record in the file of this patent:

UNITED STATES PATENTS

| Number | Name | Date |
| --- | --- | --- |
| 2,170,803 | Brooker | Aug. 29, 1939 |
| 2,177,403 | Brooker | Oct. 24, 1939 |

FOREIGN PATENTS

| Number | Country | Date |
| --- | --- | --- |
| 832,352 | France | 1938 |